(12) United States Patent
Kobayashi

(10) Patent No.: US 11,646,688 B2
(45) Date of Patent: May 9, 2023

(54) CONTROL DEVICE OF BRUSHLESS DC MOTOR

(71) Applicant: MIKUNI CORPORATION, Tokyo (JP)

(72) Inventor: Naoki Kobayashi, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/559,238

(22) Filed: Dec. 22, 2021

(65) Prior Publication Data
US 2022/0209698 A1 Jun. 30, 2022

(30) Foreign Application Priority Data

Dec. 25, 2020 (JP) .............................. JP2020-216734
Oct. 13, 2021 (JP) .............................. JP2021-168061

(51) Int. Cl.
| | | |
|---|---|---|
| *H02P 23/14* | (2006.01) | |
| *H02P 25/03* | (2016.01) | |
| *H02P 27/06* | (2006.01) | |
| *H02P 6/10* | (2006.01) | |
| *F04C 2/10* | (2006.01) | |

(52) U.S. Cl.
CPC ................ *H02P 23/14* (2013.01); *F04C 2/10* (2013.01); *H02P 25/03* (2016.02); *H02P 27/06* (2013.01); *F04C 2210/206* (2013.01); *F04C 2240/40* (2013.01)

(58) Field of Classification Search
CPC .......... H02P 23/14; H02P 25/03; H02P 27/06; H02P 6/10; F04C 2/10; F04C 2240/40; F04C 2210/206
See application file for complete search history.

(56) References Cited

U.S. PATENT DOCUMENTS

| | | | | |
|---|---|---|---|---|
| 7,282,876 B2 * | 10/2007 | Matsuhashi | ............... | H02P 6/17 388/825 |
| 11,088,646 B2 * | 8/2021 | Aoki | ....................... | H02P 27/08 |
| 11,114,961 B2 * | 9/2021 | Kaidu | ....................... | H02P 6/20 |
| 2020/0266732 A1 * | 8/2020 | Kaidu | ....................... | H02P 6/15 |

FOREIGN PATENT DOCUMENTS

| | | | | | |
|---|---|---|---|---|---|
| JP | 2006101573 A | * | 4/2006 | ............... | H02P 6/10 |
| JP | 2006121815 A | * | 5/2006 | | |
| JP | 2006149097 A | * | 6/2006 | | |
| JP | 2015-231242 | | 12/2015 | | |

\* cited by examiner

*Primary Examiner* — Thai T Dinh
(74) *Attorney, Agent, or Firm* — Staas & Halsey LLP

(57) ABSTRACT

The present invention includes a phase angle detection unit generating a phase angle signal switched at a timing at which a cogging torque generated with the rotation of a rotor of a brushless DC motor reaches near a peak on a negative side hindering the rotation of the rotor, an inverter circuit energizing coils of respective phases of the brushless DC motor by switching elements according to an input of a driving signal, an energization period calculation unit calculating an energization period Tw from a target rotation speed set for the brushless DC motor, and a drive control unit energizing the coils sequentially by outputting the driving signal to the respective switching elements for each energization period, gradually increasing a duty of the driving signals to the switching elements at a start of each energization period, and decreasing the duty after the phase angle signal is switched.

13 Claims, 15 Drawing Sheets

CONTROL DEVICE OF BRUSHLESS DC MOTOR

CROSS REFERENCE TO RELATED APPLICATIONS

This application claims the priority benefit of Japanese Patent Application No. 2020-216734 filed on Dec. 25, 2020, and Japanese Patent Application No. 2021-168061 filed on Oct. 13, 2021, the contents of each of which are incorporated herein by reference.

BACKGROUND OF THE INVENTION

Field of the Invention

The present invention relates to a control device of a brushless DC motor.

Description of the Related Art

For example, Japanese Patent Laid-Open Publication No. 2015-231242 discloses a control device for driving a brushless DC motor, which is provided with a rotor including a permanent magnet and a stator around which a coil of each of phases of U, V, and W is wound. A hall sensor corresponding to each of the phases is disposed at an interval of 120 degrees in the brushless DC motor, and a phase angle at an interval of 60 degrees is determined based on a combination of detection signals output from each sensor. A DC power supply is connected to the coil of each of the phases of the brushless DC motor through an inverter circuit, and the inverter circuit energizes the coil of each of the phases in rectangular wave drive of 120 degrees. In other words, a plurality of energization patterns for selectively switching between switching elements of the respective phases of the inverter circuit is preset, and these energization patterns are sequentially switched every phase angle of 60 degrees. Thereby, the coil of each of the phases is sequentially energized, with the phase being dephased by 120 degrees, while repeating an ON period of 120 degrees and an OFF period of 60 degrees. This gives a rotor a rotational force to operate the brushless DC motor.

Now, the brushless DC motor is used in various rotational regions depending on an application, and operation in the low rotational region of about 10 to 60 rpm may be required for a brushless DC motor that, for example, drives an oil pump. Since oil in low temperature has high viscosity, when an oil pump such as the one of a trochoid type or the like is driven in a normal rotational region, a cavity occurs on the suction side thereof or air is sucked from the oil seal thereof. This makes a normal oil supply difficult. As a countermeasure, an upper limit of the rotation speed of the pump may be limited when the temperature of the oil is low. In this case, the brushless DC motor, being a drive source, is required to operate in the low rotational region.

However, a cogging torque generated in the brushless DC motor is a factor to hinder its operation in the low rotational region. Particularly, since a so-called IPM motor in which a permanent magnet is embedded in a rotor thereof has a large torque, the effect is significant. The cogging torque is assumed to have the following effects. When a predetermined 2-phase coil is energized according to a certain energization pattern in the rectangular wave drive of 120 degrees, the driving torque equivalent to a torque per excitation phase is maintained, over the energization period, at a substantially constant value corresponding to the driving duty. On the other hand, the cogging torque fluctuates, according to a phase angle, to the positive side in the same direction as the driving torque and to the negative side in the opposite direction to the driving torque.

Therefore, when the driving current flowing through the coil of each of the phases is gradually increased by increasing the driving duty to start the brushless DC motor in a stop state, for example, the phase angle of the rotor cannot overcome a peak on the negative side of the cogging torque unless the driving torque exceeds an absolute value of the peak on the negative side of the cogging torque. When the driving torque increases with the driving current to the coil and exceeds the absolute value of the peak on the negative side of the cogging torque, the phase angle of the rotor overcomes the peak on the negative side of the cogging torque and the rotor suddenly starts to rotate at a speed corresponding to the driving current. The rotation speed of the rotor at this time can be considered a lower limit of the rotational region of a feasible brushless DC motor. This lower limit of the rotational region of the brushless DC motor remains on a higher rotation side than, for example, the rotational region required when the temperature of the oil pump is low as described above. As a result, the oil pump cannot be driven in the required low rotational region. Conventionally, a radical measure against this has been desired.

SUMMARY OF THE INVENTION

The present invention has been made to solve such a problem, and the object thereof is to provide a control device of a brushless DC motor capable of operating the brushless DC motor in a low rotational region without being affected by a cogging torque.

To achieve the above object, a control device of a brushless DC motor of the present invention is composed of a rotor including a permanent magnet, and a stater around which a coil of each of phases of U, V, and W is wounded, the control device of a brushless DC motor including a phase angle detection unit detecting a rotation of the rotor and generating a phase angle signal switched at a timing at which a cogging torque generated with the rotation of the rotor reaches near a peak on a negative side hindering the rotation of the rotor, an inverter circuit provided between the coil of each of the phases of the brushless DC motor and a DC power supply, and energizing the coil of each of the phases by switching a plurality of switching elements according to an input of a driving signal, an energization period calculation unit calculating an energization period by converting, into time, a target rotation speed set for the brushless DC motor, and a drive control unit energizing the coil of each of the phases sequentially on a positive side and a negative side according to a preset plurality of energization patterns by selectively outputting the driving signal to the each switching element of the inverter circuit for the each energization period calculated by the energization period calculation unit, increasing a duty of the driving signal to the switching element corresponding to the coil to be energized after a start of the each energization period, and executing a low rotation mode in which the duty of the driving signal is controlled in a decreasing manner after the phase angle signal generated by the phase angle detection unit is switched.

According to the control device of the brushless DC motor of the present invention, the brushless DC motor can be operated in a low rotational region without being affected by the cogging torque.

DETAILED DESCRIPTION OF THE PREFERRED EMBODIMENTS

First Embodiment

Hereinafter, a first embodiment will be described in which the present invention is embodied as a control device of a brushless DC motor provided to a cooling system.

Figure 1:
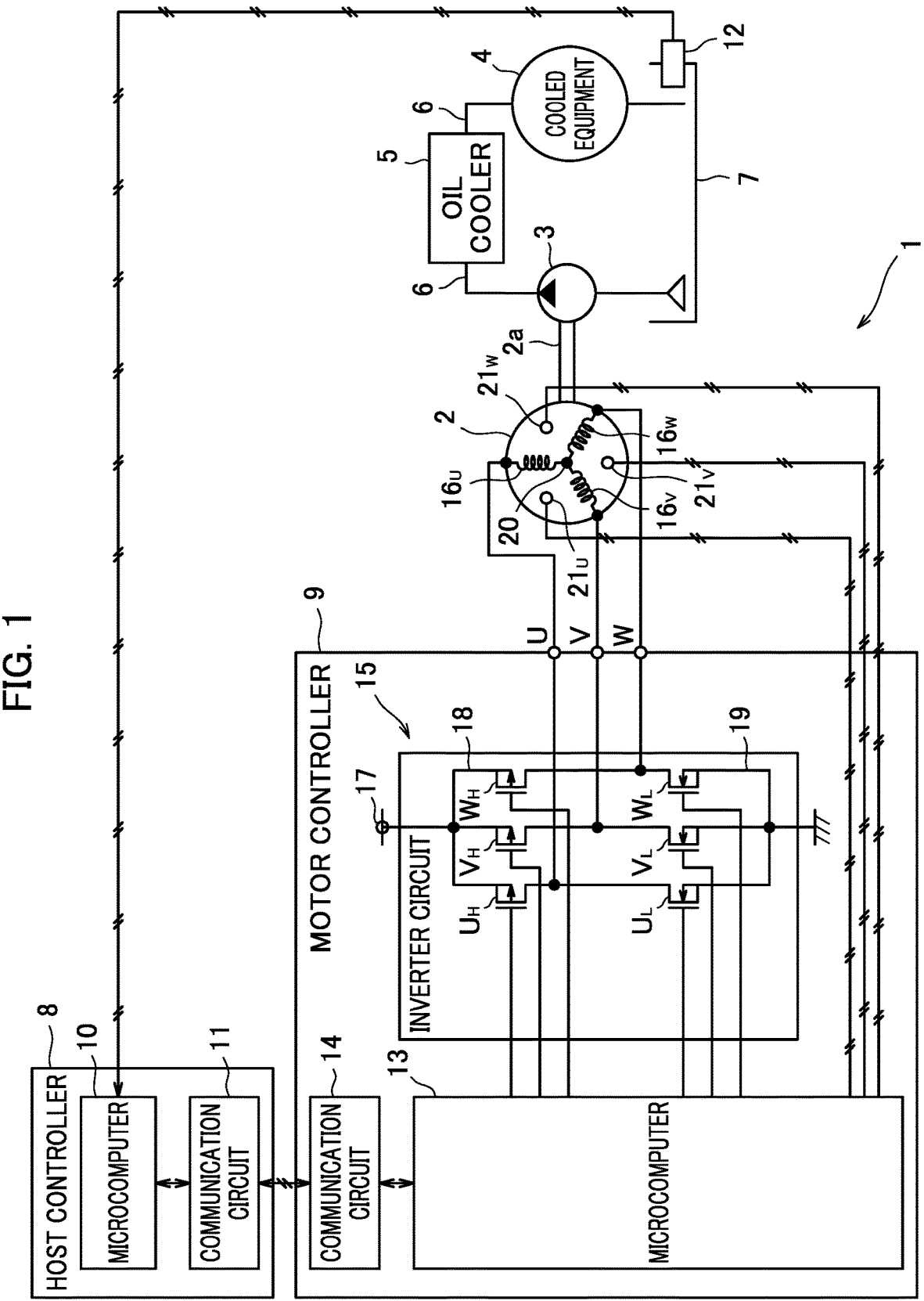
FIG. 1 is an overall configuration diagram showing a cooling system to which a control device of a brushless DC motor of a first embodiment is applied.

As shown in the overall configuration diagram of FIG. 1, a brushless DC motor 2 of the present embodiment functions to cool a cooled equipment 4 such as an electric motor or a generator by driving an oil pump 3 of a cooling system 1 to circulate cooling oil.

The brushless DC motor 2 is a motor of an IPM type including 6 poles and 9 slots. Hereinafter, all descriptions of a phase angle will be expressed by an electrical angle unless indicated otherwise. As is well known, the brushless DC motor 2 of the IPM type includes a permanent magnet embedded into a rotor thereof, and is a motor in which efficiency is enhanced by using a reluctance torque by magnetic flux induction from a stator winding, in addition to a magnet torque by a permanent magnet. The brushless DC motor 2 of the present embodiment operates by switching, depending on the rotational region thereof, between a normal mode by general rectangular wave drive of 120 degrees and a low rotation mode unique to the present invention. In the low rotation mode, coils of three phases of U, V, and W are controlled based on a cogging torque generated in the brushless DC motor 2, and the details thereof will be described below.

First, an overall configuration of the cooling system 1 will be described based on FIG. 1. The trochoid type oil pump 3 is connected to an output shaft $2a$ of the brushless DC motor 2, and the cooled equipment 4 is connected to a discharge side of the oil pump 3 through a duct 6 through which an oil cooler 5 is placed. When the brushless DC motor 2 is driven to rotate the oil pump 3, the cooling oil, which is stored in an oil pan 7, is sucked, flown through the cooled equipment 4 via the duct 6 and the oil cooler 5, and returned to the oil pan 7 afterwards. With this, the oil circulates between the oil cooler 5 and the cooled equipment 4, the heat of the oil is dissipated to lower the temperature in the oil cooler 5, and the cooled equipment 4 is cooled as the oil flows in.

The cooling system 1 operates by coordinated control of a host controller 8 and a motor controller 9. The actual drive control of the brushless DC motor 2 is executed by the motor controller 9, and information necessary for the control, for example, a target rotation speed and the like of the brushless DC motor 2 is set by the host controller 8.

The host controller 8 is made up of a microcomputer 10 and a communication circuit 11, and the microcomputer 10 includes a storage device (a ROM, a RAM, or the like) incorporating a multitude of control programs, a central processing unit (CPU), a timer counter, and the like. An oil temperature sensor 12 provided at the oil pan 7 is connected to the microcomputer 10, and a temperature of oil in the oil pan 7 detected by the oil temperature sensor 12 is input into the microcomputer 10.

The motor controller 9 is made up of a microcomputer 13, a communication circuit 14, and an inverter circuit 15, and the microcomputer 13 includes a storage device (a ROM, a RAM, or the like) incorporating a multitude of control programs, a central processing unit (CPU), a timer counter, and the like.

The brushless DC motor 2 is made up of an unillustrated rotor including a permanent magnet, and an unillustrated stator around which coils $16_U$, $16_V$, and $16_W$ of the respective phases of U, V, and W are wound, and an inverter circuit 15 is provided between the coils $16_U$, $16_V$, and $16_W$ of the respective phases and a DC power supply 17. The inverter circuit 15 is configured by three-phase bridge connection of switching elements $U_H$, $V_H$, and $W_H$ of the respective phases on the high side and switching elements $U_L$, $V_L$, and $W_L$ of the respective phases on the low side between a DC bus 18 on the positive side and a DC bus 19 on the negative side.

Connecting points of the switching elements $U_H$, $U_L$, $V_H$, $V_L$, $W_H$, and $W_L$ of the respective phases are respectively connected to one ends of the coils $16_U$, $16_V$, and $16_W$ of the corresponding phases, and the other ends of the coils $16_U$, $16_V$, and $16_W$ of the respective phases are connected to one another to form a common neutral point 20. With the DC bus 18 on the positive side being connected to the DC power supply 17 and the DC bus 19 on the negative side being grounded, a DC voltage is applied to the respective switching elements $U_H$, $U_L$, $V_H$, $V_L$, $W_H$, and $W_L$. The respective switching elements $U_H$, $U_L$, $V_H$, $V_L$, $W_H$, and $W_L$ are connected to the microcomputer 13, and the respective switching element $U_H$, $U_L$, $V_H$, $V_L$, $W_H$, and $W_L$ are switched according to a driving signal output from the microcomputer 13 so that the coils $16_U$, $16_V$, and $16_W$ of the respective phases are energized.

Hall sensors $21_U$, $21_V$, and $21_W$ of the respective phases of U, V, and W are arranged on the brushless DC motor 2 at an interval of a phase angle of 120 degrees. A signal of 360 degrees inverted every 180 degrees is input into the microcomputer 13 of the motor controller 9 from each hall sensor $21_U$, $21_V$, and $21_W$ according to a magnetic pole change, and a phase angle signal of 60 degrees is generated by a combination of the respective signals.

The microcomputers 10 and 13 of the host controller 8 and the motor controller 9 exchange information between each other through the respective communication circuits 11 and 14. For example, the microcomputer 13 of the motor controller 9 outputs an operation state (normal or abnormal) of the motor to the side of the host controller 8. The microcomputer 10 of the host controller 8 calculates a target rotation speed of the brushless DC motor 2 that is preferable for cooling the current cooled equipment 4 based on a condition of the cooled equipment 4 and the oil temperature detected by the oil temperature sensor 12, and outputs the target rotation speed to the side of the motor controller 9. For example, when the oil temperature is low, the upper limit of the target rotation speed is limited to prevent a trouble such as generation of a cavity on the suction side or suction of air from an oil seal, and the target rotation speed that is lower than that of the normal temperature range is calculated and output to the side of the motor controller 9.

The microcomputer 13 of the motor controller 9, into which the target rotation speed is input from the side of the host controller 8, switches a control mode of driving the brushless DC motor 2 between the normal mode and the low rotation mode based on a comparison result between a preset rotation determination value and the target rotation speed.

The normal mode, which is selected when the target rotation speed is a rotation determination value or more, is executed by rectangular wave drive of 120 degrees. As this rectangular wave drive of 120 degrees is a well-known driving method, only a brief explanation thereof will be given. Six types of energization patterns, in which one phase is turned on on the high side thereof, another one phase is turned on on the low side thereof, and remaining one phase is turned off on both sides of the respective switching elements $U_H$, $U_L$, $V_H$, $V_L$, $W_H$, and $W_L$, are preset corresponding to the combination of the signals from the respective hall sensors $21_U$, $21_V$, and $21_W$. Then, by sequentially switching the energization pattern for each energization period of 60 degrees obtained from the phase angle signal, the driving signal of the rectangular wave is selectively output to the respective switching element $U_H$, $U_L$, $V_H$, $V_L$, $W_H$, and $W_L$, which are then turned on. Thereby, the coils $16_U$, $16_V$, and $16_W$ of the respective phases are sequentially energized while repeating an ON period of 120 degrees and an OFF period of 60 degrees on the positive side or the negative side with the phase being dephased by 120 degrees. This gives a rotor a rotational force to operate the brushless DC motor 2.

In parallel to this, the microcomputer 13 of the motor controller 9 calculates a duty of the driving signal that can achieve the target rotation speed, controls the driving signals to be supplied to the respective switching elements $U_H$, $U_L$, $V_H$, $V_L$, $W_H$, and $W_L$ based on this duty, and regulates the driving currents flowing through the coils $16_U$, $16_V$, and $16_W$ of the respective phases. Thereby, the brushless DC motor 2 is maintained at the target rotation speed as the driving torque thereof is regulated.

As already described, in the rectangular wave drive of 120 degrees, when the coils $16_U$, $16_V$, and $16_W$ of the predetermined two phases are energized according to a certain energization pattern, a driving torque equivalent to a torque per excitation phase is maintained at a substantially constant value over the energization period. Therefore, in order to continue the rotation of the rotor against a cogging torque, a driving current that is large to some extent needs to be applied to the coils $16_U$, $16_V$, and $16_W$. This results in a problem that the brushless DC motor 2 cannot be operated in a low rotational region.

The low rotation mode dissolves such a defect of the rectangular wave drive of 120 degrees and enables operation of the brushless DC motor 2 in the low rotational region. The rotation determination value is set on a side of revolution slightly higher than a lower limit of the rotational region in which operation by the rectangular wave drive of 120 degrees is possible, for example, at 200 rpm. The brushless DC motor 2 operates by the low rotation mode in the rotational region lower than the rotation determination value. When the oil temperature is low, in order to prevent a trouble of the oil pump 3, the target rotation speed lower than the rotation determination value is calculated by the microcomputer 10 of the host controller 8. Therefore, the brushless DC motor 2 at this time operates in the low rotation mode.

Figure 2:
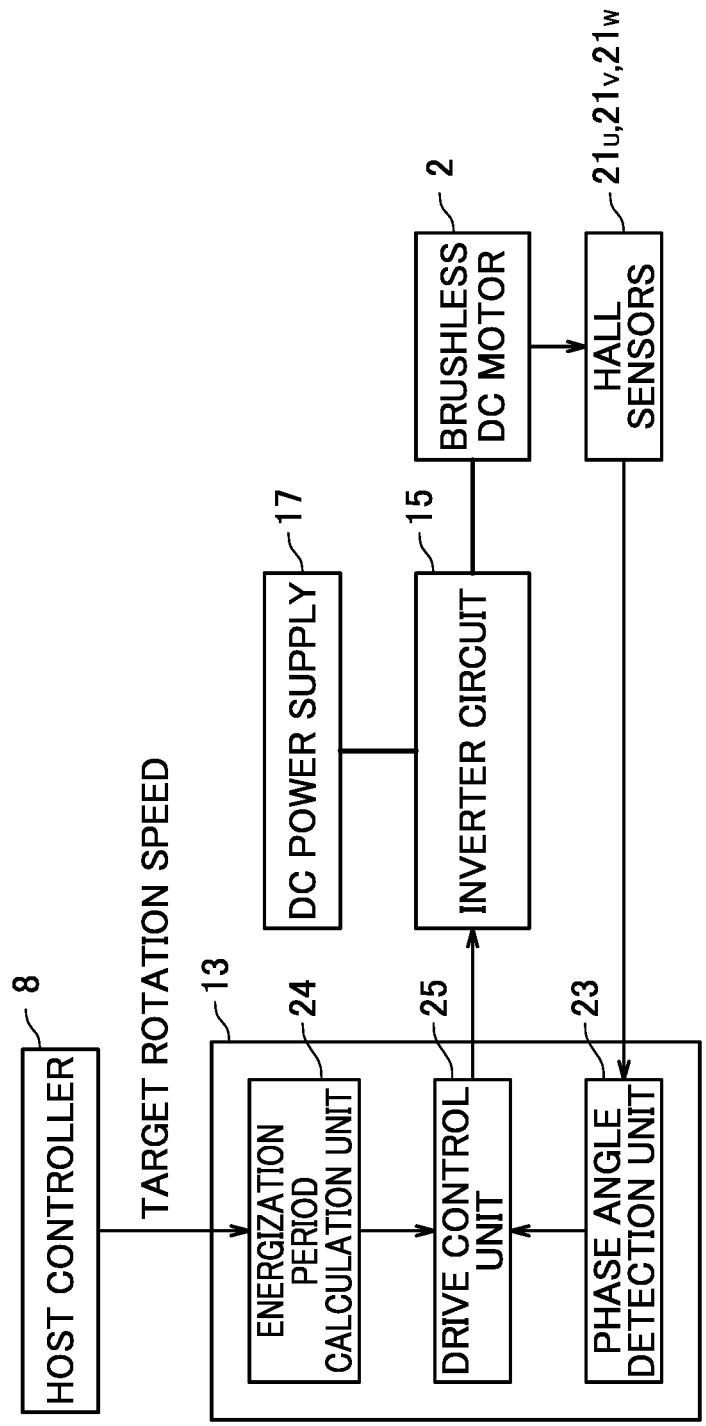
FIG. 2 is a control block diagram showing a configuration of a microcomputer of a motor controller.

To execute the low rotation mode, the microcomputer 13 of the motor controller 9 is made up of a phase angle detection unit 23, an energization period calculation unit 24, and a drive control unit 25 as shown in FIG. 2.

The phase angle detection unit 23 functions as a phase angle detection unit of the present invention with the hall sensors $21_U$, $21_V$, and $21_W$ of the respective phases, and generates a phase angle signal of 60 degrees based on a combination of signals of 360 degrees, which are inverted every 180 degrees, from the respective hall sensors $21_U$, $21_V$, and $21_W$.

The energization period calculation unit 24 calculates an energization period Tw by converting, into time, the target rotation speed of the brushless DC motor 2 input from the host controller 8. Here, the energization period Tw is an energization period for making a 60-degree turn.

The drive control unit 25 outputs the driving signal selectively to the respective switching elements $U_H$, $U_L$, $V_H$, $V_L$, $W_H$, and $W_L$ of the inverter circuit 15 according to the energization pattern for each energization period Tw calculated by the energization period calculation unit 24, which turns on the switching elements. Thereby, the coils $16_U$, $16_V$, and $16_W$ of the respective phases are sequentially energized to the positive side and the negative side. The energization pattern at the low rotation mode is selected corresponding to a combination of signals from the respective hall sensors $21_U$, $21_V$, and $21_W$ in the same manner as the rectangular wave drive of 120 degrees of the normal mode. However, although the rectangular wave drive of 120 degrees maintains a constant duty corresponding to the target rotation speed during the energization pattern, the duty of the driving signal in the low rotation mode is controlled based on a fluctuation state of the cogging torque to rotate the rotor while overcoming the peak on the negative side of the cogging torque existing in the energization period Tw.

Figure 3:
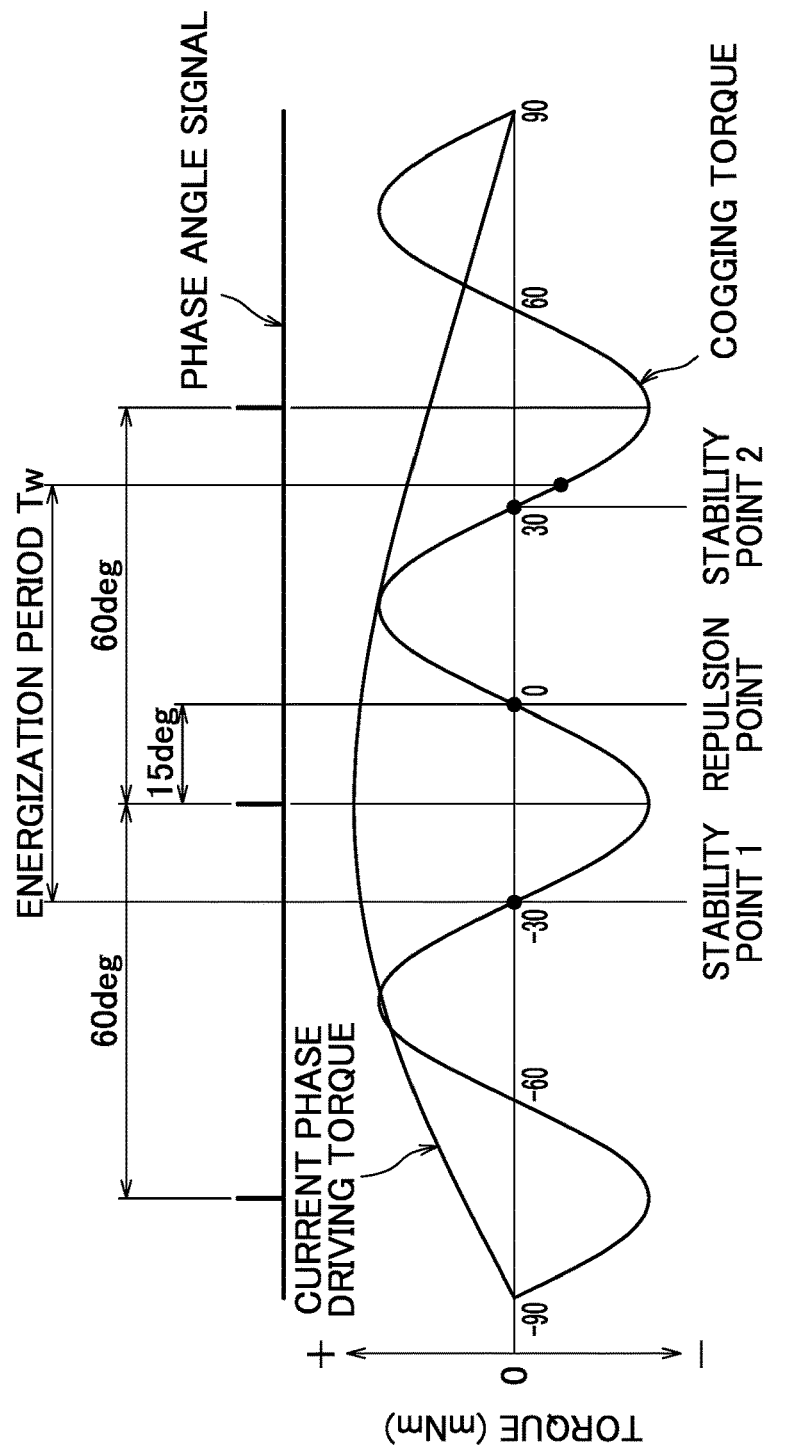
FIG. 3 is a diagram showing a relation among a cogging torque, a phase angle signal, and a driving torque in a low rotation mode.

To execute this duty control, the drive control unit 25 of the microcomputer 13 needs to recognize the peak of the cogging torque generated with the rotation of the rotor. For this purpose, the phase angle signal is used in the present embodiment. In the brushless DC motor 2, the cogging torque fluctuates with the phase angle of 60 degrees as one cycle as shown in FIG. 3, and six peaks are generated per one rotation of the rotor on the positive side in the same direction of the driving torque and on the negative side in the opposite direction of the driving torque, respectively. Then, the rotor is urged to rotate when receiving a cogging torque of the positive side, and hindered from rotating when receiving a cogging torque of the negative side.

By such actions of the cogging torques, at a phase angle of −30 degrees and a phase angle of 30 degrees at which the cogging torque changes from the positive side to the negative side shown in FIG. 3, for example, a stability point 1 and a stability point 2 exhibiting an action of drawing the rotor and maintaining the rotor at the phase angles are formed. Further, at a phase angle 0 degree at which the cogging torque changes from the negative side to the positive side, a repulsion point exhibiting an action of repelling the rotor and keeping the rotor away from the phase angle, which is contrary to the stability point, is formed. As a result, the phase angle of the rotor when the driving torque is not received is kept away from the repulsion point, drawn to either of the stability points 1 and 2, for example, and maintained thereat.

On the assumption of these cogging torques, the phase angles of the hall sensors $21_U$, $21_V$, and $21_W$ of the respective phases are set. In other words, by the combination of signals of the respective hall sensor $21_U$, $21_V$, and $21_W$ as described above, the phase angle signal is switched every 60 degrees which is the same cycle of that of the cogging torque. Then, in the present embodiment, the phase angles at which the respective hall sensor $21_U$, $21_V$, and $21_W$ are arranged are respectively preset such that the switching timing of the phase angle signal matches the peak on the negative side of the cogging torque. Therefore, the combination of signals of the respective hall sensors $21_U$, $21_V$, and $21_W$ is changed every 60 degrees at which the cogging torque reaches the peak on the negative side, which then switches the phase angle signal.

Note that the peak on the negative side of the cogging torque and the switching timing of the phase angle signal do not need to be completely matched. As long as the phase angle signal is switched constantly in a certain relationship to the peak on the negative side of the cogging torque, it does not matter if some deviation is caused, and the present invention shall also include such an embodiment.

On the other hand, in the brushless DC motor of the present embodiment, the driving torque is synchronized with the cogging torque fluctuating as described above, which will be described hereinafter.

As is generally known, in the brushless DC motor 2 of the IPM type, a combined torque is generated in which a magnet torque and a reluctance torque are added. In the low rotation mode of the present embodiment, since the energization pattern thereof is not different from that of the rectangular wave drive of 120 degrees, a driving torque, which is equivalent to the sum of combined torques of two excited phases, acts on the rotor as a rotational force. Here, the peak of the reluctance torque is at a phase angle dephased by 45 degrees with respect to the peak of the magnet torque. On the other hand, even when the same magnet torque is used, the peak value of the reluctance torque increases or decreases depending on the specification of the brushless DC motor 2 such as the shape of the rotor and the like, for example. Then, according to this, the phase angle at which the combined torque reaches the peak and consequently the phase angle at which the driving torque reaches the peak are changed. This fact means that the phase angle of the peak of the driving torque can be arbitrarily changed within a predetermined range by appropriately changing the specification of the brushless DC motor 2.

By focusing attention on such characteristics, in the present embodiment, the peak of the driving torque is matched with the peak on the negative side of the cogging torque. In other words, according to the specification of the brushless DC motor 2 of the present embodiment as shown in FIG. 3, the cogging torque reaches the peak on the negative side at the phase angle lagged by 15 degrees from the phase angle of 0 degree corresponding to the peak of the magnet torque, in other words, at −15 degrees that is the phase angle on the side in the anti-rotational direction. Thus, the driving torque is also set to reach the peak at the phase angle of −15 degrees by appropriately changing the specification of the brushless DC motor 2.

However, the peak on the negative side of the cogging torque and the peak of the driving torque do not need to be matched, and the present invention shall also include an embodiment in which the peaks of the two are not matched to cause deviation.

In order for the phase angle of the rotor to overcome the peak on the negative side of the cogging torque in each energization period Tw, the driving torque needs to exceed the absolute value of the peak on the negative side at the timing at which the cogging torque reached the peak on the negative side. Therefore, a duty is set that generates a driving torque to the extent of exceeding the absolute value of the peak on the negative side of the cogging torque. This is the same when the peak of the driving torque is not matched with the peak on the negative side of the cogging torque. In this case, at the phase angle of −15 degrees at which the cogging torque reaches the peak on the negative side, a characteristic line is set such that a driving torque equivalent to duty=100% sufficiently exceeds the absolute value of the peak.

Figure 4:
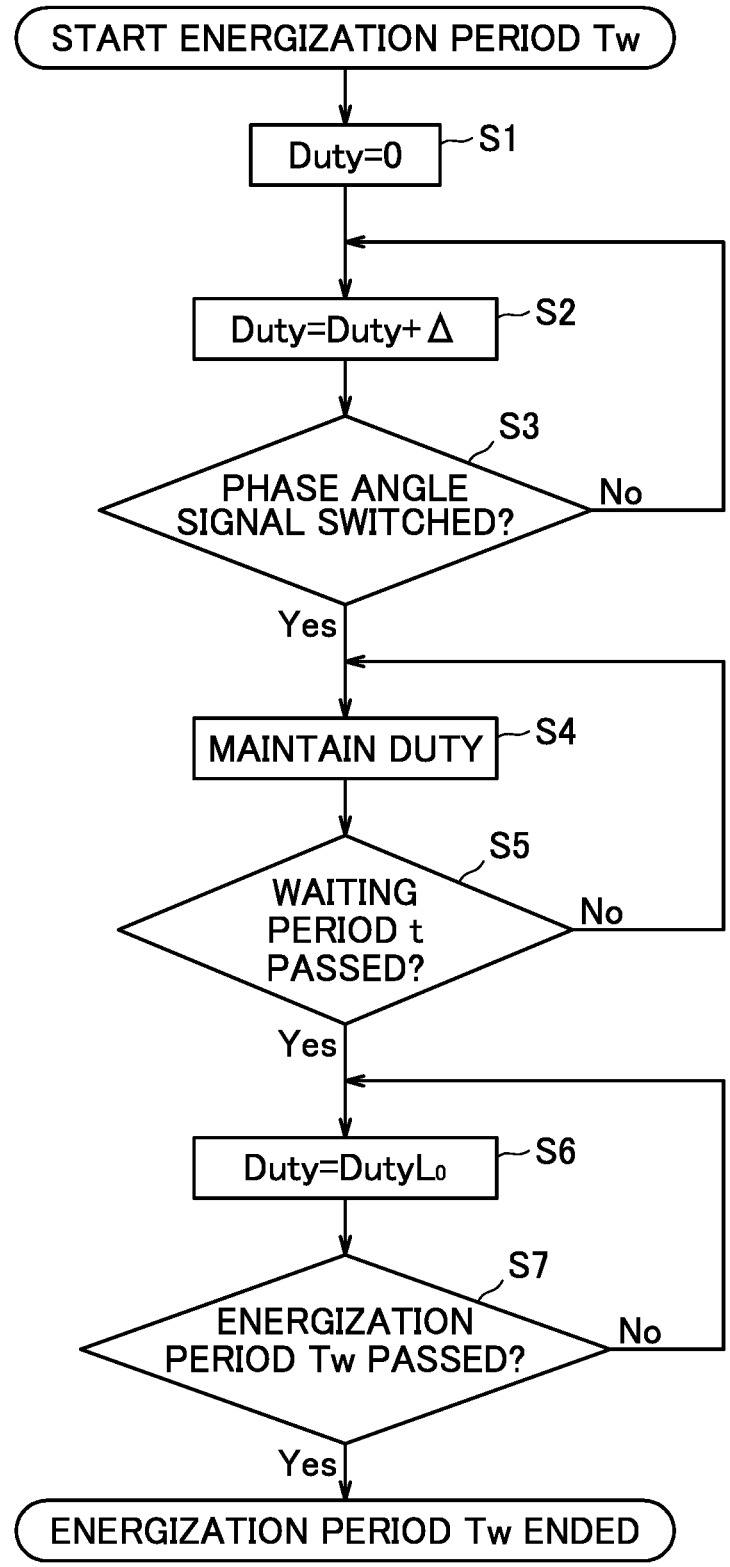
FIG. 4 is a flow chart showing a low rotation control routine executed by a drive control unit.
Figure 5:
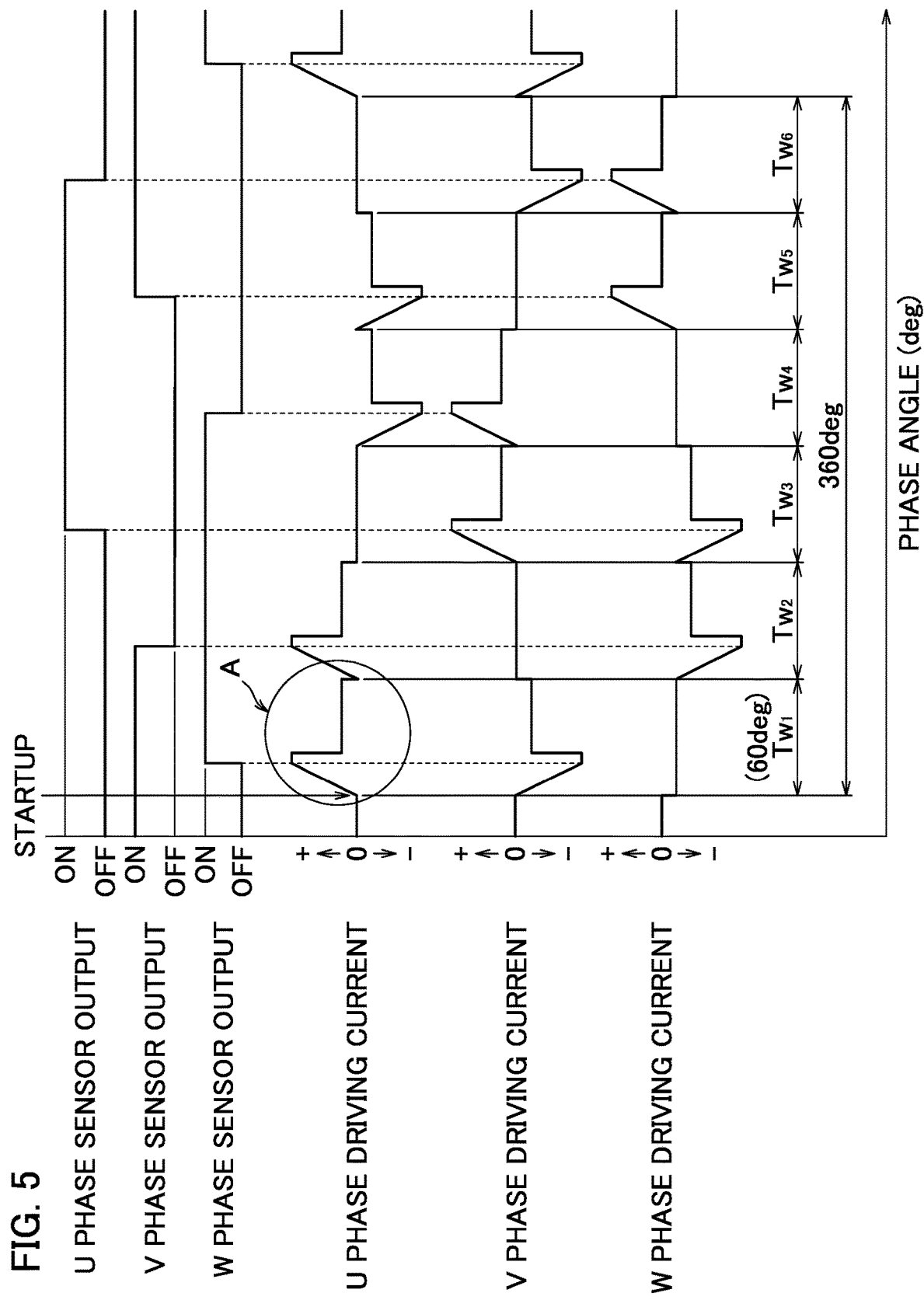
FIG. 5 is a diagram showing a switching timing of a phase angle signal based on a sensor output of each of phases, and a control state of a driving current flowing through a coil of each of the phases.
Figure 6:
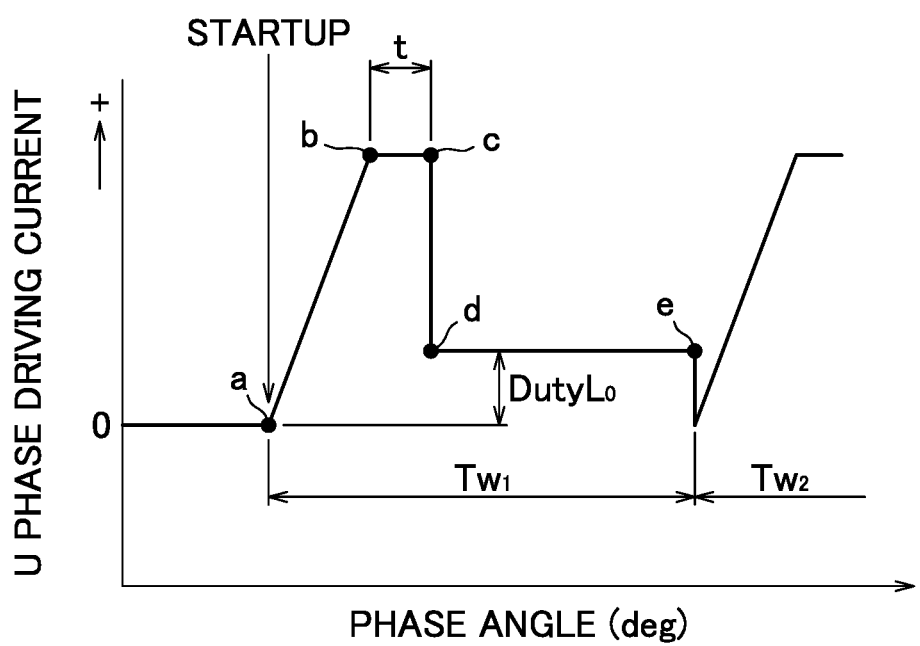
FIG. 6 is a detailed drawing showing a control state of the driving current in an energization period $Tw_1$ of a U phase surrounded by A in FIG. 5.

FIG. 4 is a flowchart showing a low rotation control routine executed in the low rotation mode by the drive control unit 25, and the routine is repeatedly executed every time the energization period Tw is calculated and started based on the target rotation speed. Further, FIG. 5 is a diagram showing switching timings of the phase angle signals based on sensor outputs of the respective phases, and a control state of the driving currents flowing through the coils $16_U$, $16_V$, and $16_W$ of the respective phases, and FIG. 6 is a detailed drawing showing a control state of the driving current in an energization period $Tw_1$ of the U phase encircled as A in the FIG. 6. The driving currents in the respective phases in FIGS. 5 and 6 can be considered as the duties of the driving signals suppled to the switching elements $U_H$, $U_L$, $V_H$, $V_L$, $W_H$, and $W_L$, or the driving torques generated by the brushless DC motor 2. Hereinafter, based on FIGS. 5 and 6, in place of the driving current, the control state of the duty of the driving signal and the driving torque may be described.

When the target rotation speed is input from the host controller 8, the energization period Tw calculated based on the target rotation speed is started, with which the routine of FIG. 4 is started. In step 1, the duty of the driving signal supplied to each switching element $U_H$, $U_L$, $V_H$, and $V_L$ is temporarily controlled to 0%. Then, in step 2, a set value Δ is added to the duty of the driving signal to the switching elements $U_H$, $U_L$, $V_H$, and $V_L$ corresponding to the coils $16_U$, $16_V$, and $16_W$ of the phase in which the positive side or the negative side should be energized based on the energization pattern. In subsequent step 3, whether or not the phase angle signal has been switched is determined, and the process returns to step 2 if it is No (negative).

The example shown in FIGS. 5 and 6 illustrates a case in which the energization period $Tw_1$ is calculated based on the target rotation speed to start the brushless DC motor 2. In the energization period $Tw_1$, the switching elements $U_H$, $U_L$, $V_H$, and $V_L$ on the high side of the U phase and the low side of the V phase are turned on, and a duty of each driving signal starts to increase at a predetermined increase rate from 0% by the processing of step 2 for each control interval of the drive control unit 25 (point a in FIG. 6), with which the driving torque also gradually increases with the driving currents of the U phase and the V phase.

When a determination of Yes (positive) is given in step 3 of FIG. 4 based on the switching of the phase angle signal, the duty of the driving signal at that point of time is maintained in step 4 (point b in FIG. 6). In subsequent step 5, whether or not the preset waiting period t has passed is determined. The process returns to step 4 if it is No, and the process moves to step 6 if a determination of Yes is given in step 5. Therefore, the duty of the driving signal is maintained over the waiting period t as shown in FIGS. 5 and 6, and the driving currents of the U phase and the V phase are maintained at values of the time at which the phase angle single is switched and at the control torque corresponding to the driving current at this time.

When the waiting period t has passed (point c in FIG. 6), the process moves to step 6 and the duty of the driving signal is decreased stepwise to a preset reduction value $DutyL_o$ (point d in FIG. 6). In subsequent step 7, whether or not the energization period Tw has passed is determined. The process returns to step 6 if the determination is No, and the routine is temporarily ended if the determination of step 7 is Yes (point e in FIG. 6).

Now, the processing of the energization period $Tw_1$ is ended to start a subsequent energization period $Tw_2$ based on a new target rotation speed input from the host controller 8. Although overwrapping descriptions will be omitted, in this energization period $Tw_2$, the processing of the routine of FIG. 4 is executed on the U phase and the W phase according to the energization pattern in the same manner as described above, and in a subsequent energization period $Tw_3$ and onwards, the same processing is also executed while sequentially changing a phase to be energized according to the energization pattern.

The operation state of the brushless DC motor 2 in the low rotation mode executed by the drive control unit 25 described above will be described based on FIGS. 3 and 7. Note that the time chart of FIG. 7 shows a case in which 0.5 second is calculated as the energization period Tw based on the target rotation speed.

Figure 7:
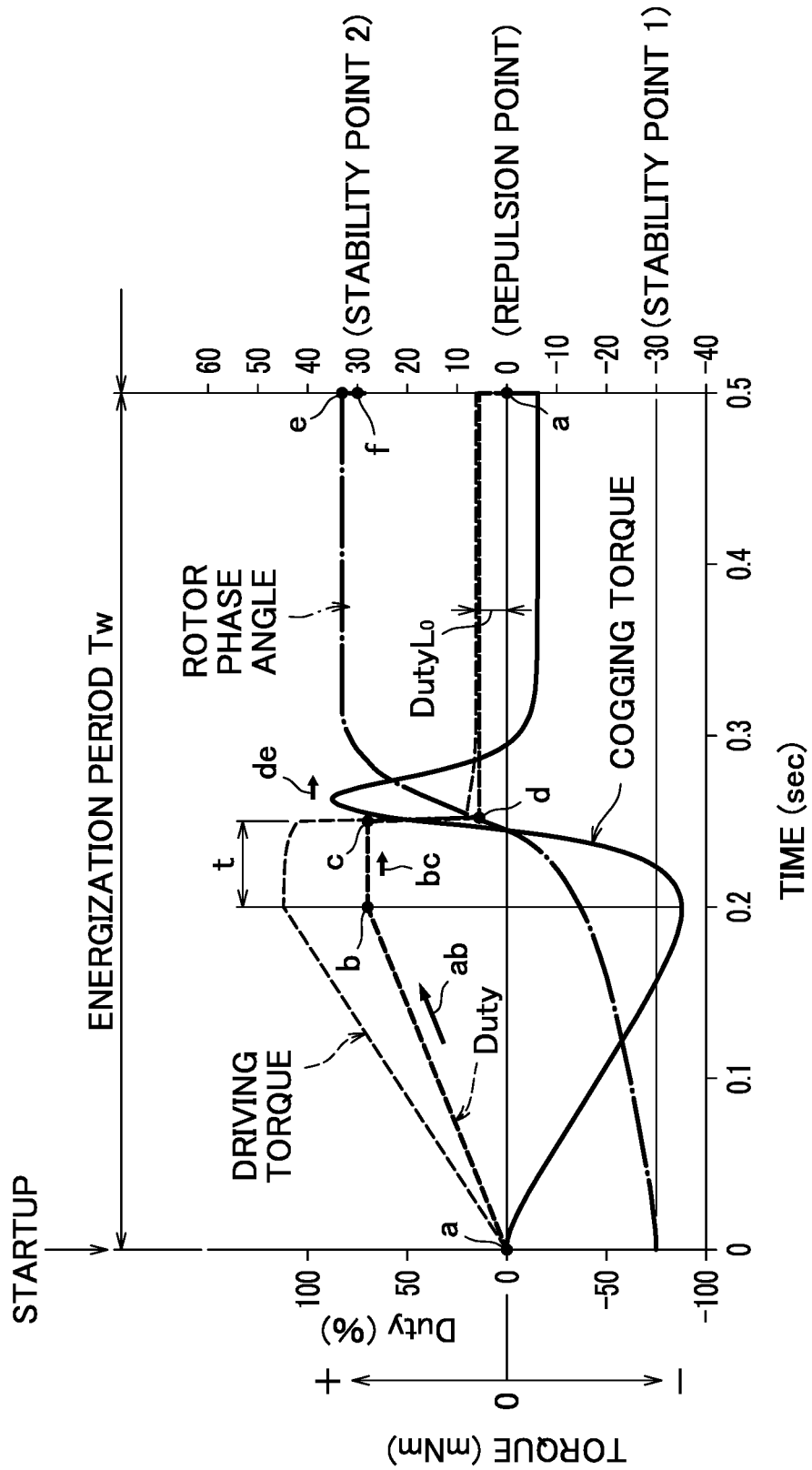
FIG. 7 is a time chart showing an operation state of the brushless DC motor in the low rotation mode since a startup thereof.

When the brushless DC motor 2 is stopped, the driving signal is maintained at duty=0% (point a in FIG. 7) and the rotor is stopped at the stability point 1 of the cogging torque shown by the phase angle of −30 degrees in FIGS. 3 and 7, for example. When the target rotation speed is input from the host controller 8 to start the brushless DC motor 2, the energization period Tw is started. A driving signal is supplied to the switching elements $U_1$, $U_L$, $V_H$, and $V_L$ of the phases to be energized, and the duty gradually increases from 0% (an arrow ab in FIG. 7). With this increase in duty, the driving current to the coils $16_U$ and $16_V$ and the driving torque also gradually increase. Therefore, the rotor starts to rotate from the stability point 1 while resisting the cogging torque, making the phase angle thereof gradually close to the peak on the negative side of the cogging torque.

When the phase angle signal is switched, the increase of the duty of the driving signal is stopped to start the waiting period t (point b in FIG. 7) and the duty at the point in time is maintained over the waiting period t to continue the rotation of the rotor (an arrow bc in FIG. 7). As shown in FIG. 3, the cogging torque has reached the peak on the negative side when the phase angle signal is switched. Therefore, the switching of the phase angle signal means that the rotor is rotating, in other words, a driving torque that can overcome the peak on the negative side is generated. Thus, further increase of the duty of the driving torque, which means the increase of the driving torque, can be considered unnecessary.

However, as shown in FIG. 3, although the absolute value of the cogging torque turns to decrease through the peak on the negative side at the switching timing of the phase angle signal, this still acts in the direction of hindering the rotation of the rotor. Therefore, if the driving torque disappears at this point in time, the rotor may turn back without completely overcoming the peak on the negative side of the cogging torque. Since the driving torque at the point of time at which the increase of the duty is canceled is maintained over the waiting time t, the rotor continues rotating while resisting the cogging torque, reliably overcomes the peak on the negative side of the cogging torque, and passes the repulsion point of the phase angle of 0 degree. As is apparent from this description, the waiting period t is set as a time having a length to the extent of allowing the phase angle of the rotor to pass the repulsion point of the cogging torque.

The process in which the rotor overcomes the peak on the negative side of the cogging torque as described above will be described in further detail. The duty of the driving signal gradually increases with the start of the energization period Tw, and when the cogging torque reaches the peak on the negative side, the driving torque of the current phase also reaches the peak as shown in FIG. 3. As described above, since the duty generating the driving torque to the extent of overcoming the absolute value of the peak on the negative side of the cogging torque is set, the increase of the duty allows the phase angle of the rotor to reliably overcome the peak on the negative side of the cogging torque.

Assuming that the peak of the driving torque is displaced to the advanced side or the lag side with respect to the peak on the negative side of the cogging torque, a lower driving torque displaced from the peak is used to resist the cogging torque. This results in a necessity to reset a characteristic line of the driving torque on the increase side in order for the phase angle of the rotor to overcome the peak on the negative side of the cogging torque. In this case, a problem occurs such as increase in size of the brushless DC motor 2, for example. In the present embodiment, an effect is obtained that such a problem can be prevented.

On the other hand, when the waiting period t has passed after such processes (point c in FIG. 7), the duty of the driving signal decreases stepwise to the reduction value $DutyL_o$ (point d in FIG. 7), with which the driving torque is also decreased. In the case of a technique disclosed in Japanese Patent Laid-Open Publication No. 2015-231242, the brushless DC motor 2 studently starts to rotate, but this situation is prevented by a stepwise reduction of the duty. Further, in terms of power consumption, the present embodiment is superior because wasteful energization after the rotor overcomes the peak on the negative side of the cogging torque is blocked by decreasing the duty of the driving signal to the reduction value $DutyL_o$.

Then, although the driving torque acting on the rotor also stepwise decreases with the reduction of the duty, the driving torque equivalent to the reduction value $DutyL_o$ is left. Additionally, since the cogging torque at this point in time is changed from the negative side to the positive side after passing through the repulsion point (an arrow de in FIG. 7), the cogging torque acts in the direction of urging the rotor to rotate. Therefore, the rotor continues rotating after the waiting period t has passed, and is maintained at a phase angle slightly closer to the advance side than the stability point 2 of the phase angle of 30 degrees, in other words, at a phase angle on the side in the rotational direction (point e in FIG. 7). Then, the current energization period Tw is ended. When a subsequent energization period Tw is started, the duty of the driving signal temporarily decreases to 0%, and the rotor slightly turns back to the stability point 2 of the phase angle of 30 degrees as the driving torque disappears (point f in FIG. 7). Therefore, in the energization period Tw immediately before, the phase angle of the rotor is substantially changed by 60 degrees.

Thereafter, an operation similar to the above is executed from the point a in FIG. 7 according to the energization pattern set in the subsequent energization period Tw. Such duty control is repeated for each energization period Tw, and the rotor continues rotating while overcoming the peak on the negative side of the cogging torque.

Note that a rotational fluctuation of the rotor occurring during the energization period Tw depends on a specification of the brushless DC motor 2 or various settings thereof such as the increase rate of the duty, the waiting period t, and the reduction value $DutyL_o$, according to which, the rotor may or may not stop rotating momentarily at a stability point of the cogging torque, for example, the stability points 1 and 2 in the examples described above. However, in either case, the rotor continues rotating stepwise while fluctuating the rotation in sync with the energization period Tw.

Then, as described above, the phase angle signal is used as an index to sequentially switch the energization pattern every 60 degrees in the normal mode, whereas the phase angle signal is used to duty-control the driving signal in sync with the peak on the negative side of the cogging torque every 60 degrees in the low rotation mode.

In other words, regardless of the switching timing of the phase angle signal, the target rotation speed is converted into time to obtain the energization period Tw and the energization pattern is sequentially switched in sync with this energization period Tw. In each energization period Tw, a peak on the negative side of the cogging torque hindering the rotation of the rotor exists, and the duty of the driving signal which is increased with the start of the energization period Tw is sequentially controlled by using, as a trigger, the switching timing of the phase angle signal that matches the peak on the negative side of the cogging torque. As a result, increase of the duty can be canceled at an appropriate timing corresponding to the peak on the negative side of the cogging torque, and a series of duty control to be followed, consisting of maintenance at a constant value over the waiting period t, reduction to the reduction value $DutyL_o$, and maintenance at the reduction value $DutyL_o$, can also be executed at an appropriate timing.

By the duty control of the driving signal described above, the rotor reliably overcomes the peak on the negative side of the cogging torque existing in the current energization period Tw. In addition to this, a situation in which the rotor even overcomes the peak on the negative side of the cogging torque existing in the subsequent energization period Tw is prevented, and the rotor is maintained at the above-described stability point 2, for example. As a result, in each energization period Tw, the rotor changes the phase angle by 60 degrees from the stability point 1 to the stability point 2 while rotating stepwise. Then, since the duty of the driving current is proactively controlled such that that the rotor overcomes a peak on the negative side of the cogging torque as described above, even in the brushless DC motor 2 of the IPM type having a large cogging torque, the phase angle change of the rotor as described above is achieved.

On the other hand, since the energization period Tw is a value obtained by converting the target rotation speed into time, the energization period Tw can be considered a time required for the rotor to rotate by 60 degrees regardless of the pitch of the target rotation speed. Therefore, the target rotation speed is achieved when the rotor rotates by 60 degrees for each energization period Tw. As a result, the intended phase angle change of the rotor can be realized within the energization period Tw without being affected by the cogging torque, which allows the brushless DC motor 2 to be operated in the low rotational region.

When the oil temperature is low, in order to prevent a trouble of the oil pump 3, a target rotation speed lower than the rotation determination value is output from the host controller 8 to the side of the motor controller 9. At this time, since the brushless DC motor 2 operates in the low rotation mode to achieve the target rotation speed, an original purpose of the cooling system 1, which is to cool the cooled equipment 4, can be achieved while the trouble of the oil pump 3 at the time of low oil temperature is prevented.

Note that as described above, the rotor may not stop rotating momentarily at the stability point 1 or 2 depending on the specification or the like of the brushless DC motor 2. In that case, the change of the phase angle of the rotor occurring within the energization period Tw is not exactly 60 degrees. However, when the change of the phase angle of the rotor within the current energization period Tw is less than 60 degrees, for example, the change of the phase angle in the subsequent energization period Tw increases by the lacking amount. Therefore, even when there are differences in the change of the phase angle among the individual energization periods Tw, the change is 60 degrees if averaged. As a result, the target rotation speed can be achieved. The present invention shall also include such an embodiment.

Now, the duty of the driving signal is increased at a predetermined increase rate with the start of the energization period Tw because it is intended to cancel the duty increase at an appropriate timing within the energization period Tw and to execute the series of duty control to be followed appropriately and reliably. For example, when the duty is slowly increased, the driving torque does not exceed the absolute value of the peak on the negative side of the cogging torque within the energization period Tw, or the timing to exceed the absolute value is delayed. This results in a lack of sufficient time to execute the subsequent duty control within the energization period Tw. Contrarily, when the duty is rapidly increased, the timing to cancel the increase is not able to catch up, and an excessive duty exceeding the expected value is maintained over the waiting period t, for example. In either case, the intended phase angle change of the rotor within the energization period Tw cannot be realized.

In view of the above, an appropriate set value Δ is preset, and the duty of the driving signal is increased at an increase rate based on this set value Δ. Thereby, the duty control of the driving signal can be appropriately executed within the energization period Tw. As a result, the operation of the brushless DC motor 2 in the low rotational region can be reliably realized by changing the rotor at the intended phase angle within the energization period Tw.

Further, although the duty of the driving signal is decreased stepwise after the waiting period t has passed, the duty is maintained at the reduction value $DutyL_o$ without being decreased to 0%. Therefore, the driving torque is left in the amount equivalent to the reduction value $DutyL_o$ after the waiting period t has passed, and the rotor stops at a stability point against a friction torque. This makes it possible to start the rotation of the rotor smoothly in the subsequent energization period Tw.

Second Embodiment

Next, a second embodiment will be described in which the present invention is embodied as a control device of another brushless DC motor 2. The difference from the first embodiment is that when the energization period Tw is started, the duty of the driving signal is maintained at the reduction value $DutyL_o$ without being decreased to 0%. Therefore, though not illustrated, the duty of the driving signal is controlled at the reduction value $DutyL_o$ in step 1 of the flow chart of FIG. 4. Since the other features are the same as those of the first embodiment, overlapping descriptions thereof will be omitted for the common features and the description will be focused on differences.

Figure 8:
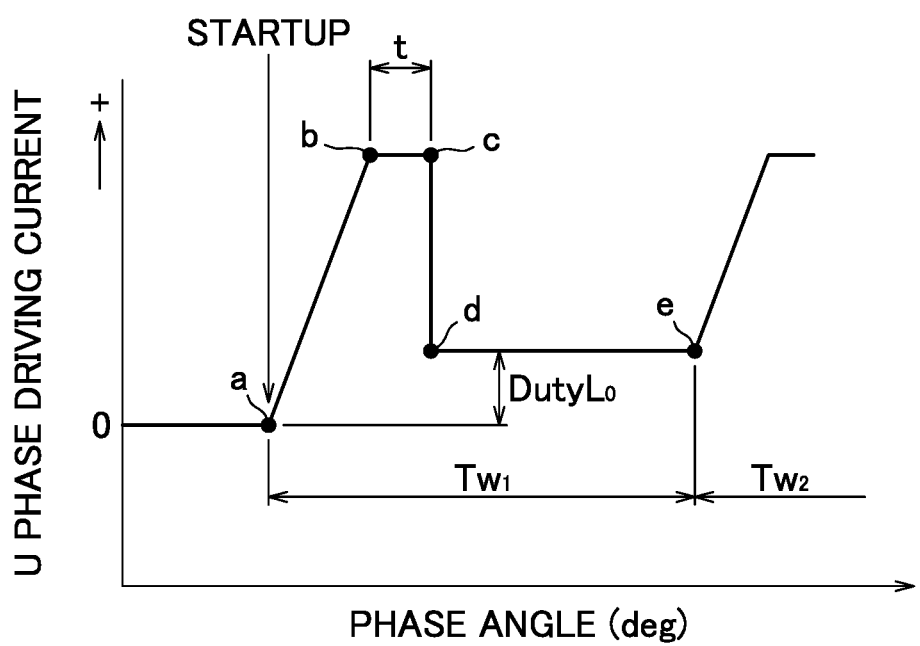
FIG. 8 is a detailed drawing showing a control state of the driving current in an energization period $Tw_1$ of a U phase of a second embodiment.

FIG. 8 is a detail drawing showing a control state of the driving current corresponding to FIG. 6 of the first embodiment, and shows the control state of the driving current of the U phase when the brushless DC motor 2 is started at point a of the energization period $Tw_1$. As described in the first embodiment, the duty decreases stepwise to the reduction value $DutyL_o$ (point d of FIG. 8) after increase of the duty of the driving signal, cancellation of the increase thereof (point b in FIG. 8), and maintenance thereof at a constant value over the waiting period t. Then, the duty is maintained at the reduction value $DutyL_o$ to end the current energization period Tw. In a subsequent energization period $Tw_2$, the coil of the U phase continues being energized based on the energization pattern. Unlike the first embodiment, the duty of the driving signal to the U phase at this time does not decrease to 0% at the start of the subsequent energization period $Tw_2$. The reduction value $DutyL_o$ is maintained by the processing of step 1 of FIG. 4, and the duty starts to increase from the reduction value $DutyL_o$ by the subsequent processing of step 2 (point e in FIG. 8). Note that for the phases kept non-energized in the subsequent energization period $Tw_2$, the duty is maintained at 0% as usual.

Figure 9:
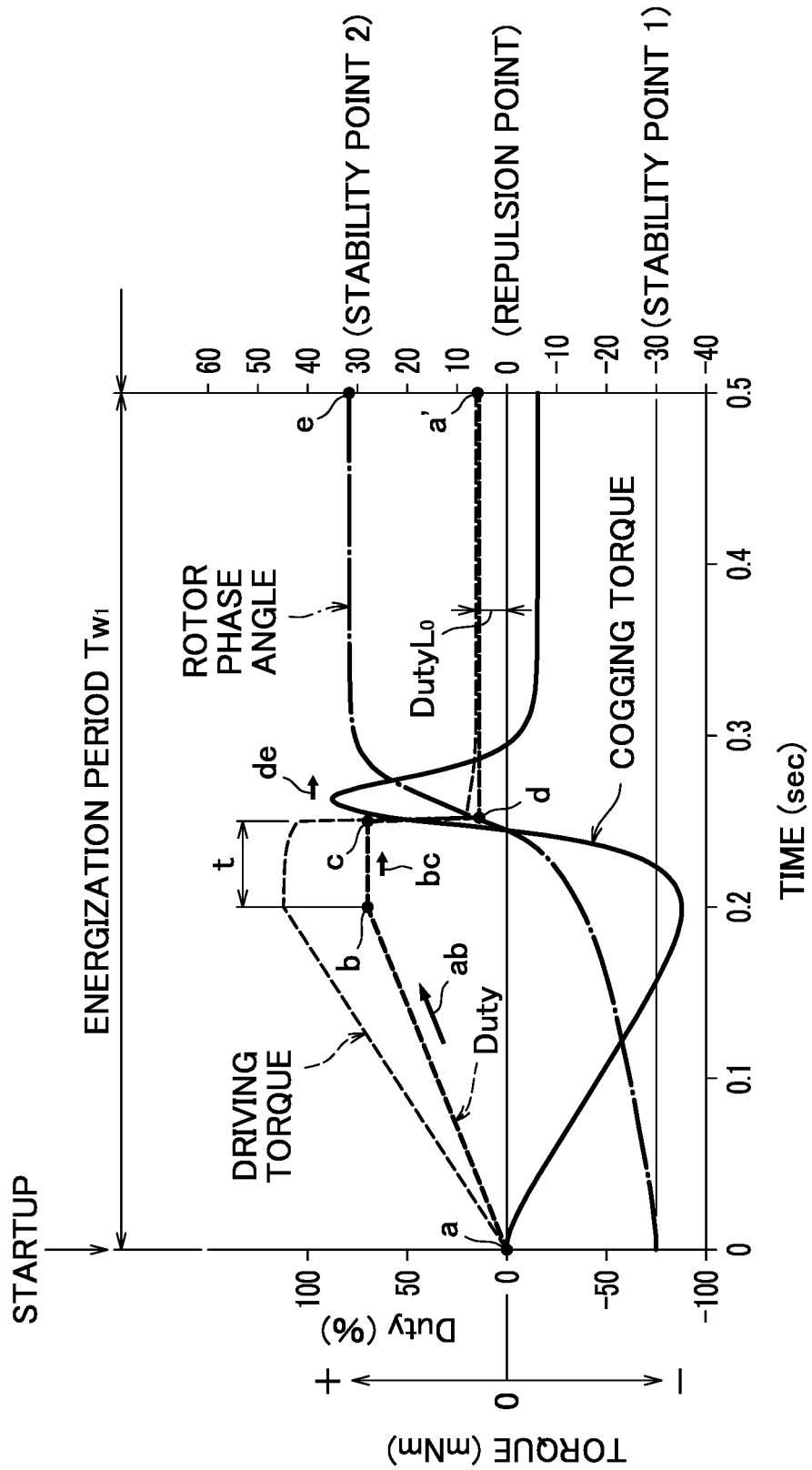
FIG. 9 is a time chart showing an operation state of the brushless DC motor in the low rotation mode since the startup thereof.
Figure 10:
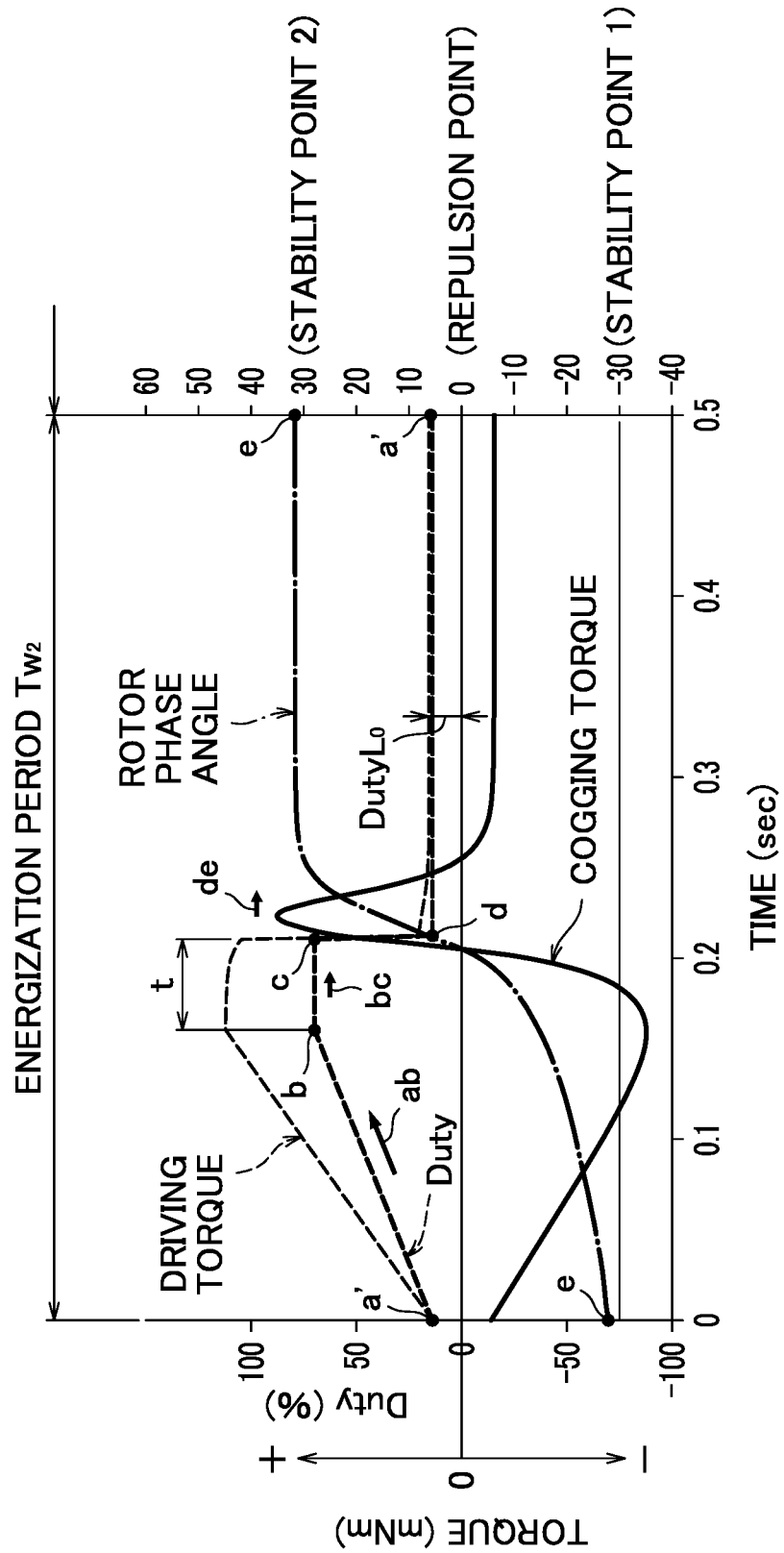
FIG. 10 is a time chart showing an operation state of the brushless DC motor during continuous operation in the low rotation mode.

FIG. 9 is a time chart since the startup corresponding to FIG. 7 of the first embodiment, and the operation state within the current energization period Tw, is the same in content, but the difference lies in that the duty of the driving signal is maintained at the reduction value $DutyL_o$ without decreasing to 0% when the subsequent energization period $Tw_2$ is started (point a' in FIG. 9). When the subsequent energization period $Tw_2$ is started, the duty of the driving signal starts to increase from the reduction value $DutyL_o$ as shown in FIG. 10 (point a' in FIG. 10). Then, unlike the first embodiment, the rotor immediately starts to rotate without turning back to the stability point 2 (point e in FIG. 10).

In the first embodiment, the rotor turns back, though slightly, to the stability point 2 for each energization period Tw, and the driving torque momentarily disappears at the stability point 2 because of duty=0%. This causes the rotation of the rotor to lack in smoothness. In the present embodiment, the rotor is prevented from such turning back, and the driving torque equivalent to the reduction value $DutyL_o$ continues acting on the rotor. Therefore, when the subsequent energization period Tw is started and the duty of the driving signal increases, the rotor starts to rotate smoothly. These factors allow the brushless DC motor 2 to operate still more smoothly in the low rotational region.

Third Embodiment

Next, a third embodiment will be described in which the present invention is embodied as a control device of another brushless DC motor 2. The difference from the first and second embodiments is that a period from increasing the duty of the driving signal from 0% to canceling the increase is variably controlled according to the target energization period Tw. Hereinafter, for convenience of the explanation, the period in which the duty is increased is referred to as a duty increase period Ti, and with respect to the waiting period t in which the duty after the increase is maintained, a period in which the duty is maintained at the reduction value $DutyL_o$ afterwards is referred to as a reduction period t1. Further, a value in which these are added is referred to as an actual energization period Ta. Furthermore, the reduction period t1 is also preset as a fixed value in the same manner as the waiting period t.

In the first and second embodiments, since the set value Δ used to increase the duty is a fixed value, the increase rate of the duty is also inevitably a fixed value. Thus, the length of the duty increase period Ti is always fixed regardless of the length of the target energization period Tw. On the other hand, for example, in the rotational region in which the low rotation mode is executed (for example, 20 to 200 rpm), the target energization period Tw set based on the target rotation speed increases and decreases greatly, and the ratio of the duty increase period Ti with respect to the target energization period Tw also inevitably increases and decreases greatly.

The target energization period Tw is shortest at the upper limit rotation speed (for example, 200 rpm) of the low rotation mode. Even in this case, however, the increase rate of the duty of the driving signal and also the set value Δ are preset to generate a driving torque that can overcome the peak on the negative side of the cogging torque. However, when this set value Δ is set, the increase of the duty is completed at the very early stage of the long target energization period Tw at the lower limit rotation speed (for example, 20 rpm) of the low rotation mode, and the duty is maintained at the reduction value $DutyL_o$ during most of the remaining period. In other words, since the driving torque rapidly increases at the very early stage of the target energization period Tw, the rotational fluctuation is large within the target energization period Tw. This easily makes the rotation of the rotor unstable.

Figure 13:
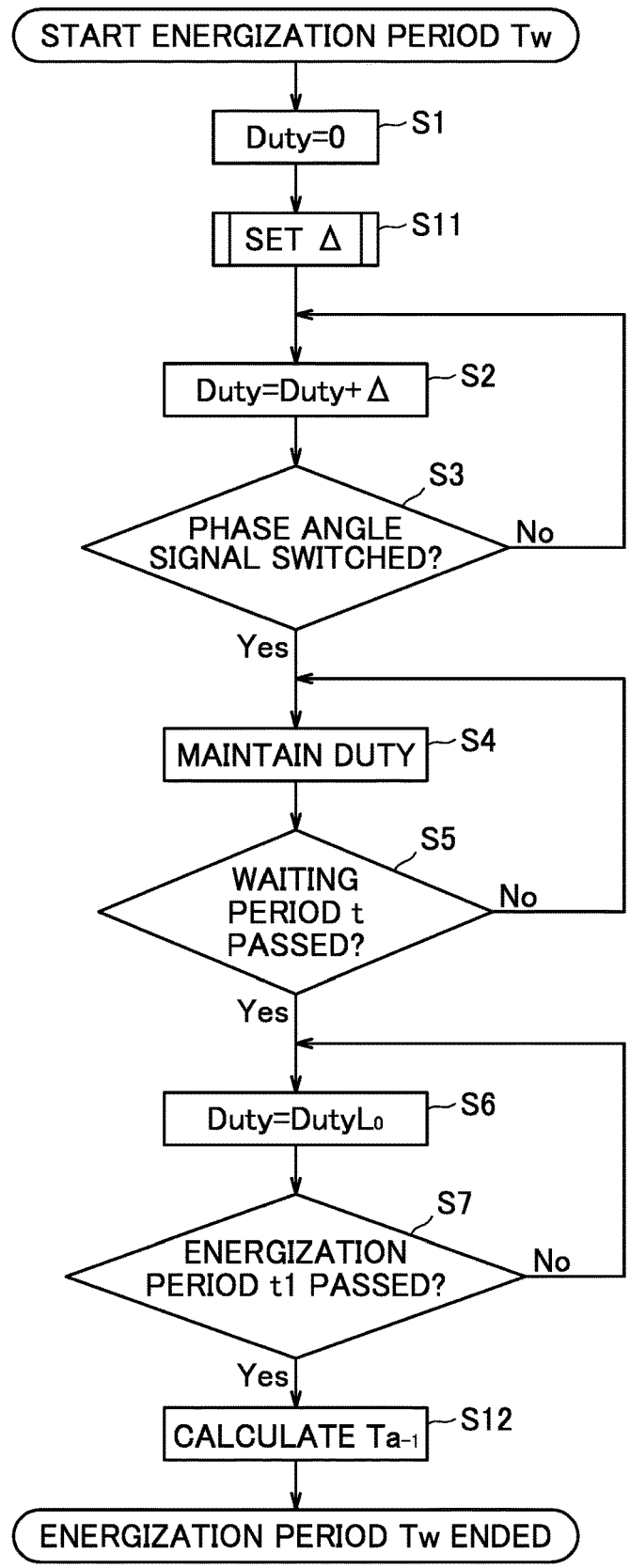
FIG. 13 is a flow chart showing a low rotation control routine executed by a drive control unit of a third embodiment.
Figure 14:
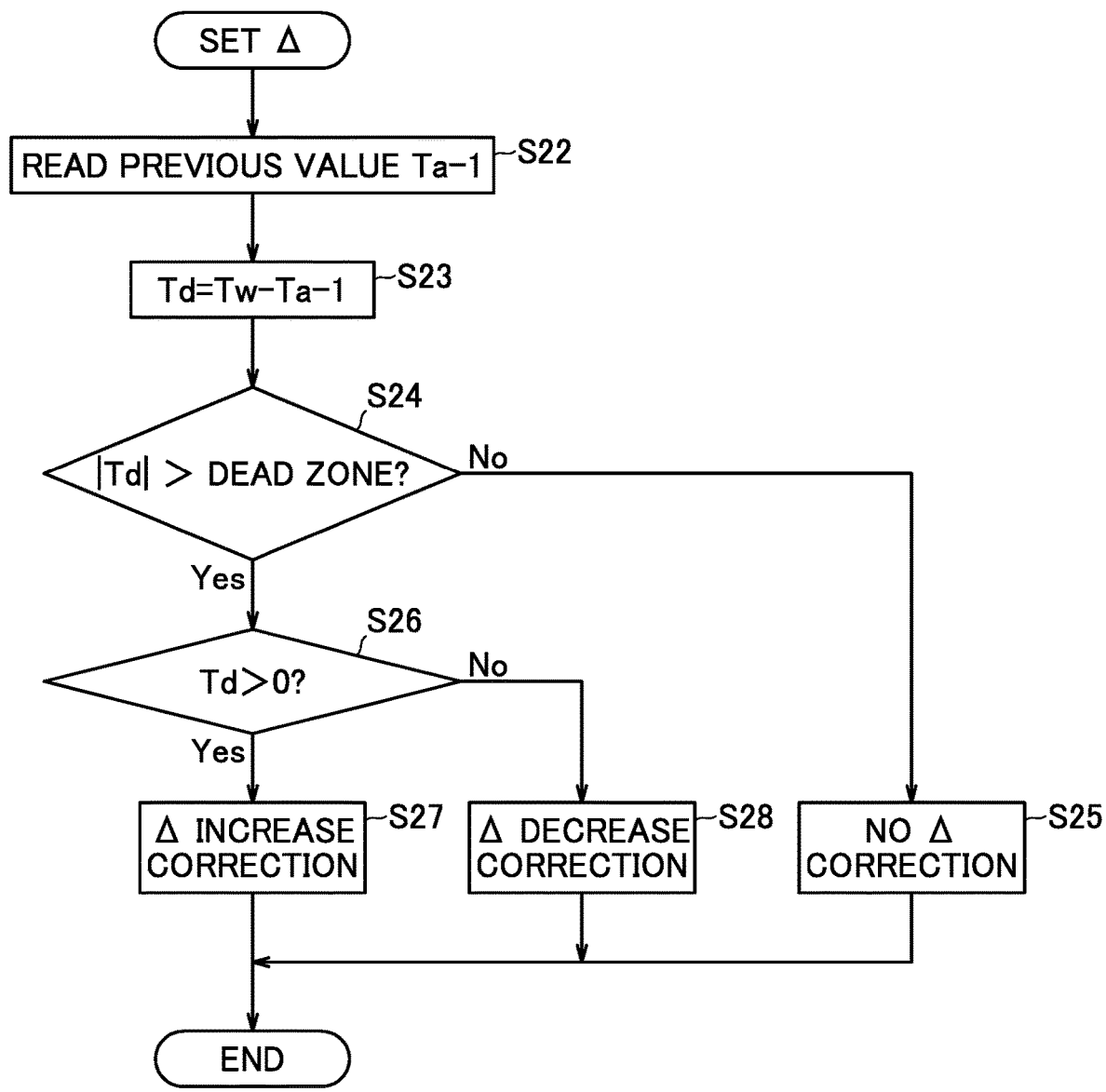
FIG. 14 is a flow chart showing a Δ setting routine in the same manner.

To improve such a phenomenon, the duty increase period Ti is variably controlled in the present embodiment, for which the drive control unit 25 of the microcomputer 13 executes the flow charts shown in FIGS. 13 and 14. Note that since the other features are the same as those of the first and second embodiments, overlapping descriptions thereof will be omitted for the common features and the description will be focused on differences.

Figure 15:
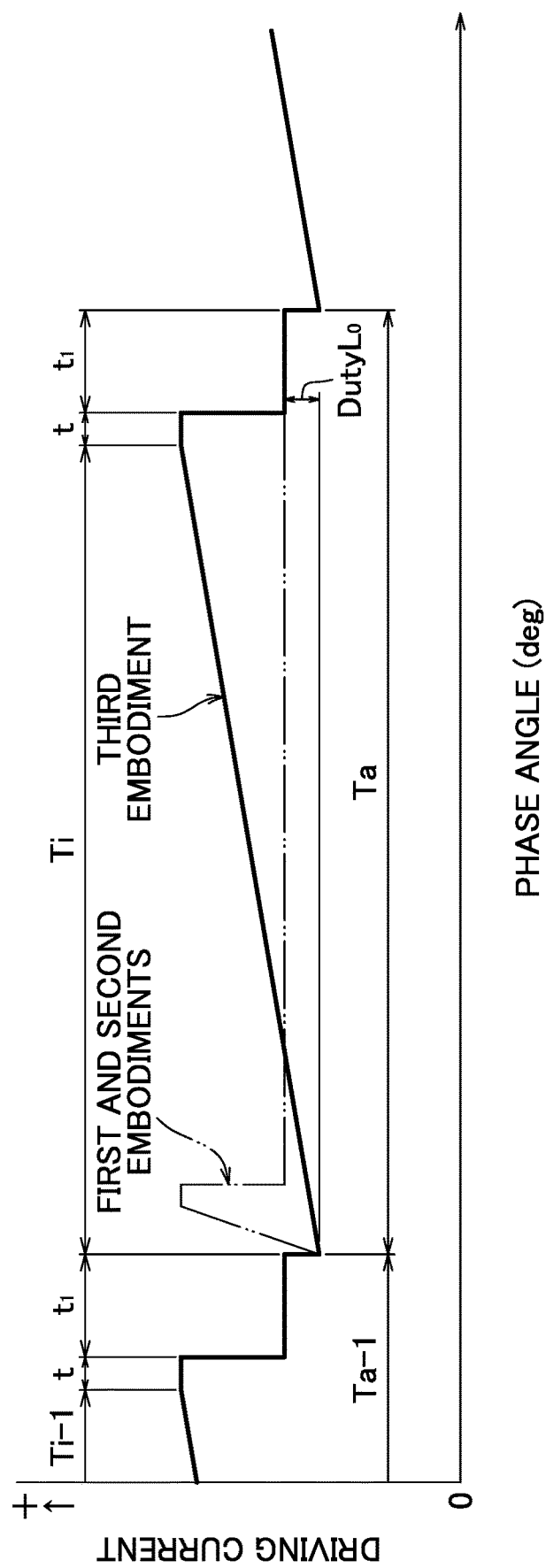
FIG. 15 is a diagram showing a control state of the driving current at a lower limit rotation speed of the low rotation mode.

FIG. 13 is a flow chart showing a low rotation control routine executed by the drive control unit 25, FIG. 14 is a flow chart showing a Δ setting routine of the same, and FIG. 15 is a diagram showing a control state of the driving current at the lower limit rotation speed of the low rotation mode.

After the duty of the driving signal is temporality controlled to 0% in step 1 of FIG. 13, processing of setting a set value Δ is executed in step 11. When the processing of step 11 is started, the process moves to step 22 of FIG. 14.

In step 22, the actual energization period Ta stored as a previous value Ta−1 in the energization period immediately before is read. In subsequent step 23, a deviation Td between the target energization period Tw and the previous value Ta−1 of the actual energization period is calculated. Subsequently, in step 24, whether or not the absolute value |Td| of the deviation Td exceeds a preset dead zone is determined. If the determination is No, the process moves to step 25 to end the routine after determining the value applied in the energization period immediately before as a set value Δ of this time, and the process moves to step 2 of FIG. 13.

Further, if the determination of step 24 is Yes, the process moves to step 26 to determine whether or not the deviation Td is 0 or higher. If the determination is Yes, the process moves to step 27 in which the set value Δ applied in the energization period immediately before is corrected to increase based on a preset correction value to obtain the set value Δ for this time. Further, if the determination of step 26 is No, the process moves to step 28 in which the set value Δ applied in the energization period immediately before is corrected to decrease based on the preset correction value to obtain the set value Δ for this time.

Based on the set value Δ set in this manner, the duty of the driving signal is sequentially increased for each control interval in steps 2 and 3. Then, when a determination of Yes is given based on the switching of the phase angle signal in step 3, the process moves to step 4. In subsequent steps 4 to 7, a series of duty control, consisting of maintenance at a constant value over the waiting period t, reduction to the reduction value $DutyL_o$, and maintenance at the reduction value $DutyL_o$, are executed as described in the first embodiment. Finally, in step 12, the actual energization period Ta in this energization period is stored as the previous value Ta−1. In the next energization period, this previous value Ta−1 is read in step 23 to be compared with the target energization period Tw.

With the above processing, when the target energization period Tw changes in the increasing direction, the set value Δ is corrected to increase so that the increase of the duty is rapid, and when the target energization period Tw changes in the decreasing direction, the set value Δ is corrected to decrease so that the increase of the duty is slow. As a result, the longer the target energization period Tw is, the more the increase rate of the duty decreases. Then, since the increase rate of the duty is regulated in accordance with the increase or decrease of the target energization period Tw, the actual energization period Ta is maintained at the substantially same value with respect to the target energization period Tw.

Therefore, at the lower limit rotation speed of the low rotation mode shown in FIG. 15, while the duty rapidly increases at the very early stage of the energization period Tw as shown by a two-dot chain line in the first and second embodiments, the duty in the present embodiment gradually increases during most of the actual energization period Ta (≠target energization period Tw) as shown by a solid line. As a result, the rotational fluctuation within the actual energization period Ta (≠target energization period Tw) is suppressed, which makes it possible to realize smoother rotation of the rotor.

This concludes the description of the embodiments, but the aspect of the present invention is not limited to these embodiments. For example, in each embodiment described above, the present invention is embodied as the control device of the brushless DC motor 2 driving the oil pump 3 provided to the cooling system 1, but the application thereof is not limited to this and modifications can be arbitrarily made.

Further, in each embodiment described above, the brushless DC motor 2 having 6 poles and 9 slots is embodied, but as long as the condition of 2n poles and 3n slots (n≥1) is met, modifications can be arbitrarily made. For example, the present invention is applicable to the brushless DC motor having 2 poles and 3 slot or 8 poles and 12 slots.

Figure 11:
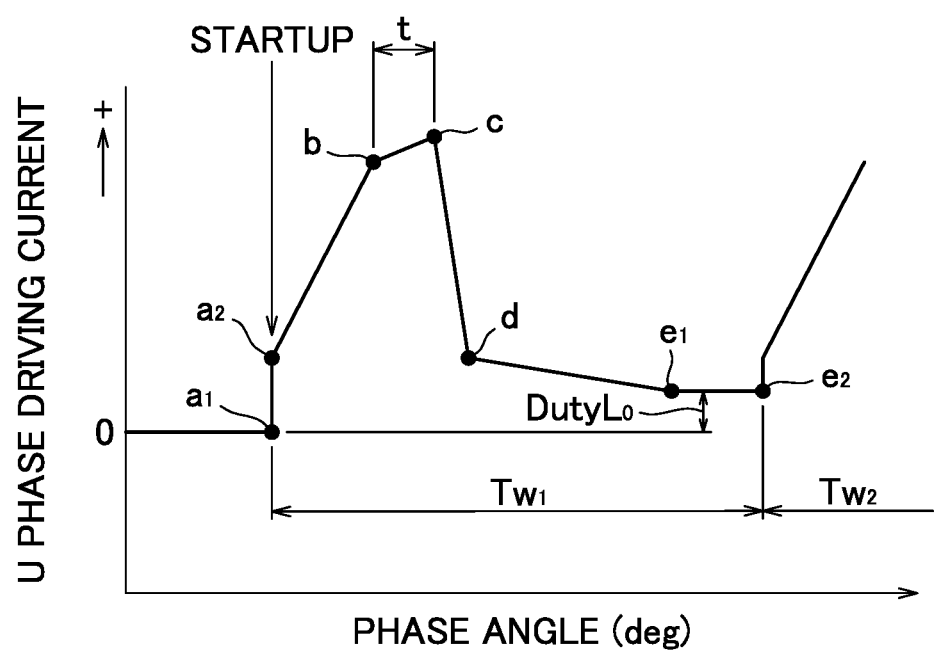
FIG. 11 is a detailed drawing corresponding to FIG. 6 showing another example of the control state of the driving current flowing through the coil of each of the phases.

Further, in each embodiment described above, the duty of the driving signal is controlled as shown in FIG. 6 or 8, but the content of the control is not limited to this. For example, the duty may be controlled according to characteristics shown in FIG. 11. In this another example, when the brushless DC motor 2 is started and the energization period Tw is started (point a1 in FIG. 11), the duty of the driving signal is increased stepwise (point a2 in FIG. 11) and then increased at a predetermined increase rate. When the phase angle signal is switched (point b in FIG. 11), the increase rate is decreased and the increase of the duty is continued over the waiting time t. After the waiting time t has passed (point c in FIG. 11), the duty is gradually decreased at a predetermined decrease rate (point d in FIG. 11), and the decrease of the duty is continued after the decrease rate is decreased (point e1 in FIG. 11). Subsequently, the duty is maintained at the reduction value $DutyL_o$, and the duty is increased from the reduction value $DutyL_o$ when the subsequent energization period Tw is started (point e2 in FIG. 11).

Even with such control, various effects described in the above first embodiment can be achieved and the effect of the second embodiment can be also achieved because the duty is increased from the reduction value $DutyL_o$ in the subsequent energization period Tw.

Figure 12:
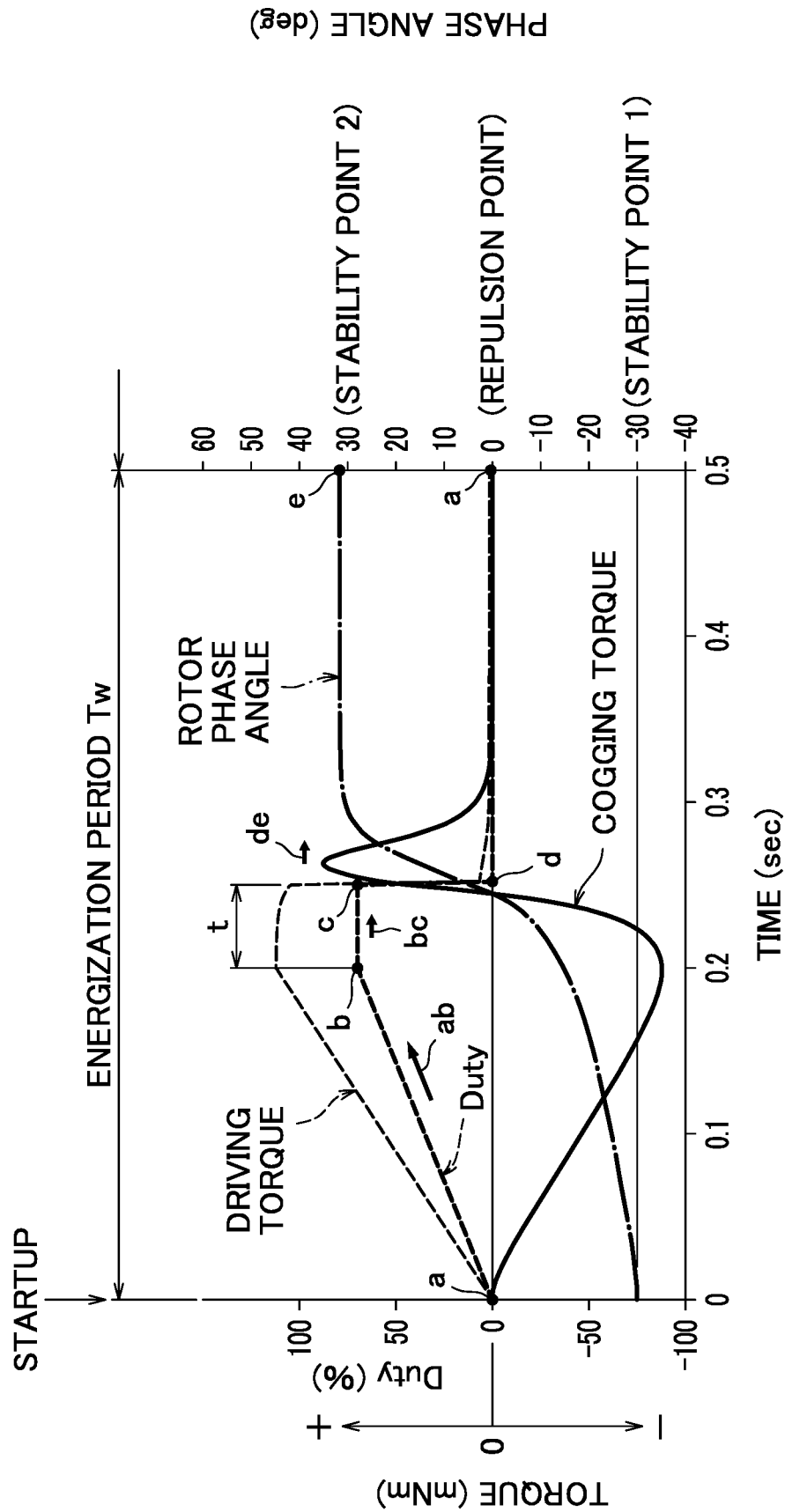
FIG. 12 is a time chart corresponding to FIG. 7 showing another example in which the duty of the driving signal is decreased stepwise to 0% after a waiting period t has passed.

Further, in each embodiment described above, the duty of the driving signal is decreased stepwise to the reduction value $DutyL_o$ after the waiting period t has passed, but the present invention is not limited to this. For example, the duty may be decreased stepwise to 0% as shown in FIG. 12. When compared with the first embodiment of FIG. 6 and the second embodiment of FIG. 8, another example of FIG. 12, in which the duty is decreased to 0%, is most superior in terms of power consumption because wasteful energization after the rotor overcomes the peak on the negative side of the cogging torque can be completely blocked. However, the driving torque disappears at duty=0%, and due to the friction torque acting on the rotor, the stopping position of the rotor is uncertain and the rotation of the rotor tends to lack in smoothness.

If the duty of the driving signal is maintained at the reduction value $DutyL_o$ without being decreased to 0% after the waiting period t has passed, as in the first embodiment, the rotor stops at a stability point against a friction torque. This makes the start of the rotation smoother in the subsequent energization period Tw as compared with another example of FIG. 12. Further, if the duty is increased from the reduction value $DutyL_o$ without decreasing the duty of the control signal to 0%, as in the second embodiment, the rotor starts to rotate in a state in which the driving torque is acting as described above. Thereby, still smoother rotation can be achieved. Therefore, the second embodiment is most superior for the smooth rotation of the rotor, followed by the first embodiment and another example of FIG. 12 in this order. For the power consumption, the order is reversed.

LIST OF REFERENCE SIGNS

2 Brushless DC motor
3 Oil pump
15 Inverter circuit $16_U$, $16_V$, $16_W$ Coils
17 DC power supply
$21_U$, $21_V$, $21_W$ Hall sensors (Phase angle detection units)
23 Phase angle detection unit
24 Energization period calculation unit
25 Drive control unit
$U_H$, $U_L$, $V_H$, $V_L$, $W_H$, $W_L$ Switching elements

What is claimed is:

1. A control device of a brushless DC motor composed of a rotor including a permanent magnet, and a stater around which a coil of each of phases of U, V, and W is wounded, comprising:
    a phase angle detection unit detecting a rotation of the rotor and generating a phase angle signal switched at a timing at which a cogging torque generated with the rotation of the rotor reaches near a peak on a negative side hindering the rotation of the rotor;
    an inverter circuit provided between the coil of each of the phases of the brushless DC motor and a DC power supply, and energizing the coil of each of the phases by switching a plurality of switching elements according to an input of a driving signal;
    an energization period calculation unit calculating an energization period by converting, into time, a target rotation speed set for the brushless DC motor; and
    a drive control unit energizing the coil of each of the phases sequentially on a positive side and a negative side according to a preset plurality of energization patterns by selectively outputting the driving signal to the each switching element of the inverter circuit for the each energization period calculated by the energization period calculation unit, increasing a duty of the driving signal to the switching element corresponding to the coil to be energized after a start of the each energization period, and executing a low rotation mode in which the duty of the driving signal is controlled in a decreasing manner after the phase angle signal generated by the phase angle detection unit is switched.

2. The control device of the brushless DC motor according to claim 1, wherein a specification is set such that a driving torque generated by energization of the coil of each of the phases reaches a peak at a timing at which the cogging torque reaches near the peak on the negative side.

3. The control device of the brushless DC motor according to claim 1, wherein the phase angle detection unit generates the phase angle signal changed every 60 degrees based on a combination of signals of 360 degrees inverted every 180 degrees output from three hall sensors in accordance with the rotation of the rotor.

4. The control device of the brushless DC motor according to claim 3, wherein the three hall sensors are each arranged at a phase angle in which a combination of one another's signals is changed every time the cogging torque reaches near the peak on the negative side.

5. The control device of the brushless DC motor according to claim 1, wherein the drive control unit executes the low rotation mode when the target rotation speed is lower than a preset rotation determination value.

6. The control device of the brushless DC motor according to claim 1, wherein the drive control unit executes a normal mode by rectangular wave drive of 120 degrees to sequentially energize the coil of each of the phases to the positive side and the negative side according to the plurality of energization patterns by selectively outputting a driving signal of a rectangular wave to the each switching element of the inverter circuit at every switching timing of the phase angle signal generated by the phase angle detection unit when the target rotation speed is a preset rotation determination value or higher, while executing the low rotation mode when the target rotation speed is lower than the rotation determination value.

7. The control device of the brushless DC motor according to claim 1, wherein the drive control unit stops increasing the duty of the driving signal when the phase angle signal generated by the phase angle detection unit is switched during an execution of the low rotation mode, and maintains the duty at this point of time over a preset waiting period.

8. The control device of the brushless DC motor according to claim 1, wherein the drive control unit decreases the duty of the driving signal stepwise to a preset reduction value after the phase angle signal generated by the phase angle detection unit is switched during the execution of the low rotation mode.

9. The control device of the brushless DC motor according to claim 1, wherein the drive control unit decreases the duty of the driving signal stepwise to 0% after the phase angle signal generated by the phase angle detection unit is switched during the execution of the low rotation mode.

10. The control device of the brushless DC motor according to claim 8, wherein the drive control unit maintains, until the energization period is ended, the duty of the driving signal decreased stepwise to the reduction value, and increases the duty of the driving signal gradually from the reduction value at a start of a subsequent energization period if the energization is continued in the subsequent energization period.

11. The control device of the brushless DC motor according to claim 1, wherein the drive control unit decreases, during the execution of the low rotation mode, an increase rate applied when the duty of the driving signal is increased in proportion to a length of the energization period calculated by the energization period calculation unit.

12. The control device of the brushless DC motor according to claim 1, wherein the brushless DC motor is an IPM motor including a permanent magnet embedded inside the rotor.

13. The control device of the brushless DC motor according to claim 1, wherein the brushless DC motor drives an oil pump sucking and discharging oil.

* * * * *